(12) United States Patent
Lee

(10) Patent No.: US 11,974,010 B2
(45) Date of Patent: Apr. 30, 2024

(54) DISPLAY DEVICE FOR CONTROLLING ONE OR MORE HOME APPLIANCES IN CONSIDERATION OF VIEWING SITUATION

(71) Applicant: LG ELECTRONICS INC., Seoul (KR)

(72) Inventor: Jaekyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 94 days.

(21) Appl. No.: 17/628,167

(22) PCT Filed: Jul. 16, 2019

(86) PCT No.: PCT/KR2019/008799
§ 371 (c)(1),
(2) Date: Jan. 18, 2022

(87) PCT Pub. No.: WO2021/010522
PCT Pub. Date: Jan. 21, 2021

(65) Prior Publication Data
US 2022/0272409 A1    Aug. 25, 2022

(51) Int. Cl.
*H04N 21/436* (2011.01)
*H04N 21/4363* (2011.01)
*H04N 21/466* (2011.01)

(52) U.S. Cl.
CPC .  *H04N 21/43615* (2013.01); *H04N 21/43637* (2013.01); *H04N 21/4667* (2013.01)

(58) Field of Classification Search
CPC ....... H04N 21/43615; H04N 21/43637; H04N 21/4667; H04N 21/251; H04N 21/4131;
(Continued)

(56) References Cited

U.S. PATENT DOCUMENTS 10,798,462 B1 * 10/2020 Acosta ............... H04N 21/4396
10,904,611 B2 *  1/2021 Van Os ................ H04N 21/858
(Continued)

FOREIGN PATENT DOCUMENTS

| KR | 1020140122908 | 10/2014 |
| KR | 1020150059081 | 5/2015 |
| KR | 1020160111284 | 9/2016 |

OTHER PUBLICATIONS

PCT International Application No. PCT/KR2019/008799, International Search Report dated Apr. 16, 2020, 2 pages.

*Primary Examiner* — Fernando Alcon
(74) *Attorney, Agent, or Firm* — LEE, HONG, DEGERMAN, KANG & WAIMEY

(57) ABSTRACT

According to an embodiment of the present invention, a display device for controlling one or more home appliances in consideration of a viewing situation can include: a display unit; a storage unit configured to store a learned usage pattern inference model by using a deep learning algorithm or a machine learning algorithm; a user input interface unit configured to receive a viewing event; and a control unit configured to obtain a viewing pattern from the received viewing event, to use the usage pattern inference model to obtain a usage pattern of the one or more home appliances from the obtained viewing pattern, and to display, on the display unit, usage recommendation information indicating the obtained usage pattern.

13 Claims, 12 Drawing Sheets

(58) Field of Classification Search
CPC ....... H04N 21/42203; H04N 21/44231; H04N 21/6582; H04N 21/466; G05B 2219/2642; G05B 15/02
See application file for complete search history.

(56) References Cited

U.S. PATENT DOCUMENTS

| | | | |
|---|---|---|---|
| 2004/0163073 A1* | 8/2004 | Krzyzanowski | ............................ H04N 21/64784 717/107 |
| 2004/0260407 A1* | 12/2004 | Wimsatt | ................ H04L 12/282 700/20 |
| 2004/0260427 A1* | 12/2004 | Wimsatt | ................ G05B 15/02 700/83 |
| 2008/0092199 A1* | 4/2008 | McCarthy | ............... H04N 21/25 725/35 |
| 2009/0268960 A1* | 10/2009 | Imai | ........................ H04N 5/57 348/739 |
| 2011/0032423 A1* | 2/2011 | Jing | ....................... H05B 47/19 348/E7.001 |
| 2013/0139089 A1* | 5/2013 | Cho | ................... H04N 21/4131 715/771 |
| 2013/0245796 A1* | 9/2013 | Lentzitzky | .......... H04L 12/2834 700/90 |
| 2014/0130076 A1* | 5/2014 | Moore | ............. H04N 21/25883 725/19 |
| 2015/0019342 A1 | 1/2015 | Gupta | |
| 2015/0140990 A1 | 5/2015 | Kim et al. | |
| 2015/0159401 A1* | 6/2015 | Patrick | ................. H04N 21/478 292/137 |
| 2015/0160623 A1* | 6/2015 | Holley | ................. H04N 21/454 700/90 |
| 2015/0163535 A1* | 6/2015 | McCarthy, III | .... G07C 9/00571 725/49 |
| 2015/0254057 A1* | 9/2015 | Klein | ................. H04N 21/4668 704/275 |
| 2015/0309484 A1* | 10/2015 | Lyman | ................ H04L 12/2816 700/275 |
| 2016/0014461 A1* | 1/2016 | Leech | ................ H04N 21/4668 725/14 |
| 2016/0094883 A1* | 3/2016 | Tidwell | ................ H04N 21/812 725/109 |
| 2016/0179087 A1* | 6/2016 | Lee | .................... G01C 21/3664 700/9 |
| 2016/0231718 A1* | 8/2016 | Logan | .................... G05B 15/02 |
| 2017/0097618 A1* | 4/2017 | Cipollo | ................... G10L 15/22 |
| 2017/0146962 A1 | 5/2017 | Yang | |
| 2017/0185276 A1* | 6/2017 | Lee | ..................... G06F 3/04847 |
| 2017/0191693 A1* | 7/2017 | Bruhn | ..................... F24F 11/58 |
| 2018/0070136 A1* | 3/2018 | McCarthy, III | .. H04N 21/42201 |
| 2018/0160168 A1* | 6/2018 | Song | ............. H04N 21/44224 |
| 2019/0090014 A1* | 3/2019 | Shoop | ............. H04N 21/44231 |
| 2019/0268661 A1* | 8/2019 | Park | ................... H04N 21/4518 |
| 2020/0053312 A1* | 2/2020 | Mukherjee | ............. H05B 47/19 |
| 2022/0076669 A1* | 3/2022 | Hatambeiki | ............ G10L 15/08 |

\* cited by examiner

| Viewing pattern of display device | Viewing pattern of display device |
|---|---|
| Set sleep reservation function | Set air conditioner to sleep mode |
| View children program | Set air purifier on /set air conditioner to weak wind |
| View movie content | Dim lighting of lighting device |

# DISPLAY DEVICE FOR CONTROLLING ONE OR MORE HOME APPLIANCES IN CONSIDERATION OF VIEWING SITUATION

CROSS-REFERENCE TO RELATED APPLICATIONS

This application is the National Stage filing under 35 U.S.C. 371 of International Application No. PCT/KR2019/008799, filed on Jul. 16, 2019, the contents of which are all incorporated by reference herein in its entirety.

TECHNICAL FIELD

The present invention relates to a display device for controlling one or more home appliances in consideration of a viewing situation.

BACKGROUND ART

Digital TV services using wired or wireless communication networks are becoming common. Digital TV services are capable of providing various services that could not be provided by the existing analog broadcasting services.

For example, Internet Protocol Television (IPTV) and smart TV services, which are types of digital TV services, provide interactivity so that users can actively select the types of watching programs, the watching time, and the like. The IPTV and smart TV services can provide various additional services, such as Internet search, home shopping, and online games, based on such interactivity.

While watching TV, a user often operates other home appliances provided in the house according to the viewing situation of the TV.

For example, a user sets an air conditioner to a sleep mode while setting a sleep reservation function of a TV.

However, in this case, a user has to separately perform an action for operating the TV and an action for controlling the air conditioner, which may cause inconvenience to the user.

DISCLOSURE OF INVENTION

Technical Problem

The present invention aims to automatically control operations of home appliances according to a viewing situation of a display device.

The present invention aims to control home appliances, without an additional action, by inferring the usage patterns of the home appliances that match the viewing pattern of the display device.

Technical Solution

According to an embodiment of the present invention, a display device for controlling one or more home appliances in consideration of a viewing situation can include: a display unit; a storage unit configured to store a learned usage pattern inference model by using a deep learning algorithm or a machine learning algorithm; a user input interface unit configured to receive a viewing event; and a control unit configured to obtain a viewing pattern from the received viewing event, to use the usage pattern inference model to obtain a usage pattern of the one or more home appliances from the obtained viewing pattern, and to display, on the display unit, usage recommendation information indicating the obtained usage pattern.

According to an embodiment of the present invention, a display device for controlling one or more home appliances in consideration of a viewing situation can include: a display unit; a network interface unit configured to communicate with an artificial intelligence server; a user input interface unit configured to receive a viewing event; and a display unit configured to transmit the received viewing event to the artificial intelligence server, to receive, from the artificial intelligence server, usage recommendation information indicating usage recommendation of the one or more home appliances in response to the received viewing event, and to display the received usage recommendation information on the display unit.

Advantageous Effects

According to various embodiments of the present invention, since home appliances are automatically controlled according to a user's specific viewing situation, the user can conveniently use the home appliances.

In addition, since the user does not need an action for controlling the operation of separate home appliance, the improved user experience can be provided.

BEST MODE FOR CARRYING OUT THE INVENTION

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present invention, for example, as an artificial display device that adds a computer supporting function to a broadcast receiving function, can have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, a display device described herein, for example, can perform various user-friendly functions. The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

Figure 1:
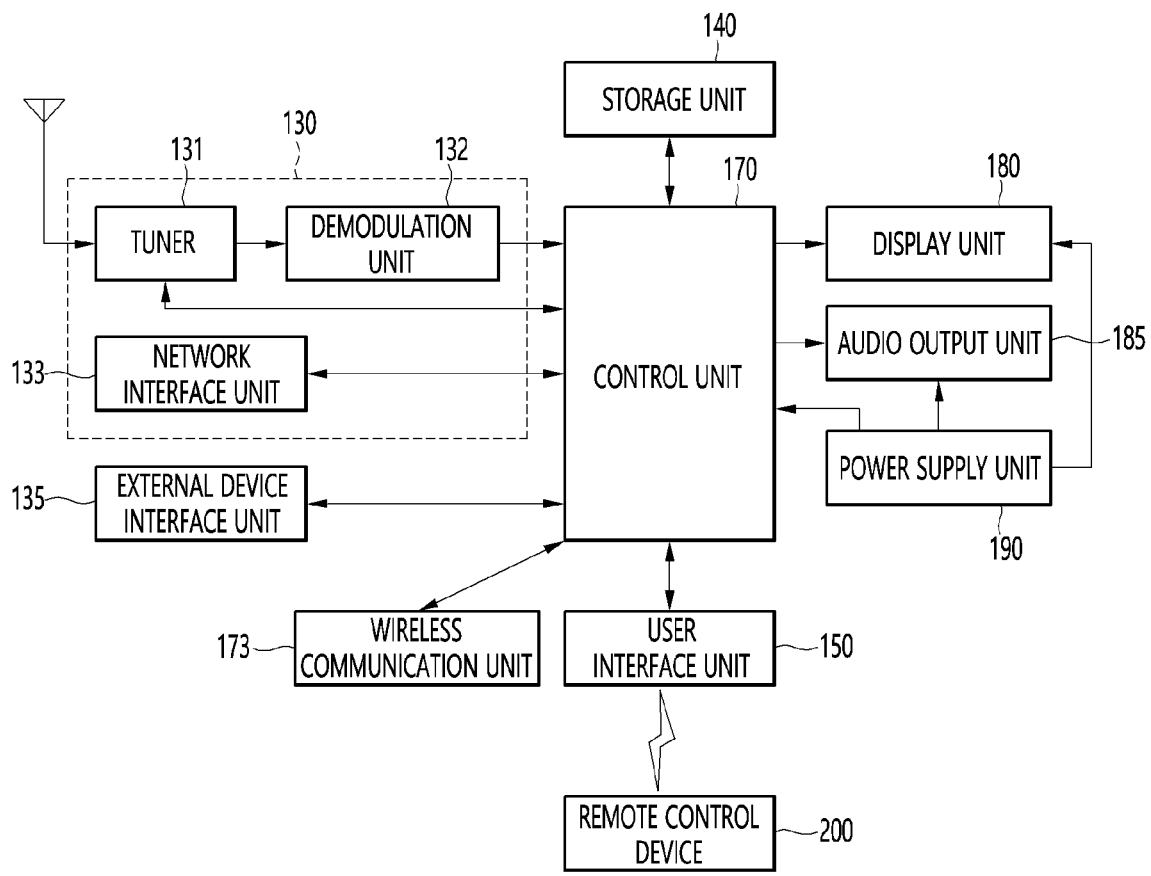
FIG. 1 is a block diagram illustrating a configuration of a display device according to an embodiment of the present invention.

FIG. 1 is a block diagram illustrating a configuration of a display device according to an embodiment of the present invention.

Referring to FIG. 1, a display device 100 can include a broadcast reception unit 130, an external device interface unit 135, a storage unit 140, a user input interface unit 150, a control unit 170, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface unit 135 can provide a connection path between the display device 100 and an external device. The external device interface unit 135 can receive at least one an image or audio output from an external device that is wirelessly or wiredly connected to the display device 100 and deliver it to the control unit 170. The external device interface unit 135 can include a plurality of external input terminals. The plurality of external input terminals can include an RGB terminal, at least one High Definition Multimedia Interface (HDMI) terminal, and a component terminal.

An image signal of an external device input through the external device interface unit 135 can be output through the display unit 180. A sound signal of an external device input through the external device interface unit 135 can be output through the audio output unit 185.

An external device connectable to the external device interface unit 135 can be one of a set-top box, a Blu-ray player, a DVD player, a game console, a sound bar, a smartphone, a PC, a USB Memory, and a home theater system, but this is just exemplary.

The network interface unit 133 can provide an interface for connecting the display device 100 to a wired/wireless network including the Internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, the network interface unit 133 can transmit or receive data to or from a corresponding server by accessing a predetermined webpage through the network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an Internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily storing image, voice, or data signals output from the external device interface unit 135 or the network interface unit 133 and can store information on a predetermined image through a channel memory function.

The storage unit 140 can store an application or an application list input from the external device interface unit 135 or the network interface unit 133.

The display device 100 can play content files (for example, video files, still image files, music files, document files, application files, and so on) stored in the storage unit 140 and provide them to a user.

The user input interface unit 150 can deliver signals input by a user to the control unit 170 or deliver signals from the control unit 170 to a user. For example, the user input interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user input interface unit 150 can deliver, to the control unit 170, control signals input from local keys (not shown) such as a power key, a channel key, a volume key, and a setting key.

Image signals that are image-processed in the control unit 170 can be input to the display unit 180 and displayed as an image corresponding to corresponding image signals. Additionally, image signals that are image-processed in the control unit 170 can be input to an external output device through the external device interface unit 135.

Voice signals processed in the control unit 170 can be output to the audio output unit 185. Additionally, voice signals processed in the control unit 170 can be input to an external output device through the external device interface unit 135.

Besides that, the control unit 170 can control overall operations in the display device 100.

Additionally, the control unit 170 can control the display device 100 by a user command or internal program input through the user input interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user input interface unit 150, the control unit 170 can output image signals or voice signals of an external device such as a camera or a camcorder, which are input through the external device interface unit 135, through the display unit 180 or the audio output unit 185.

Moreover, the control unit 170 can control the display unit 180 to display images and control broadcast images input through the tuner 131, external input images input through the external device interface unit 135, images input through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content input from the outside, and the content can be in various formats such as broadcast images, external input images, audio files, still images, accessed web screens, and document files.

Moreover, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The display unit 180 can convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents input from the image processing device.

In this case, an operating method of a display device according to an embodiment of the present invention described below can be performed by one of the display device described with reference to FIG. 1, an image processing device such as the separated set-top box, and a content playback device including the display unit 180 and the audio output unit 185.

Figure 2:
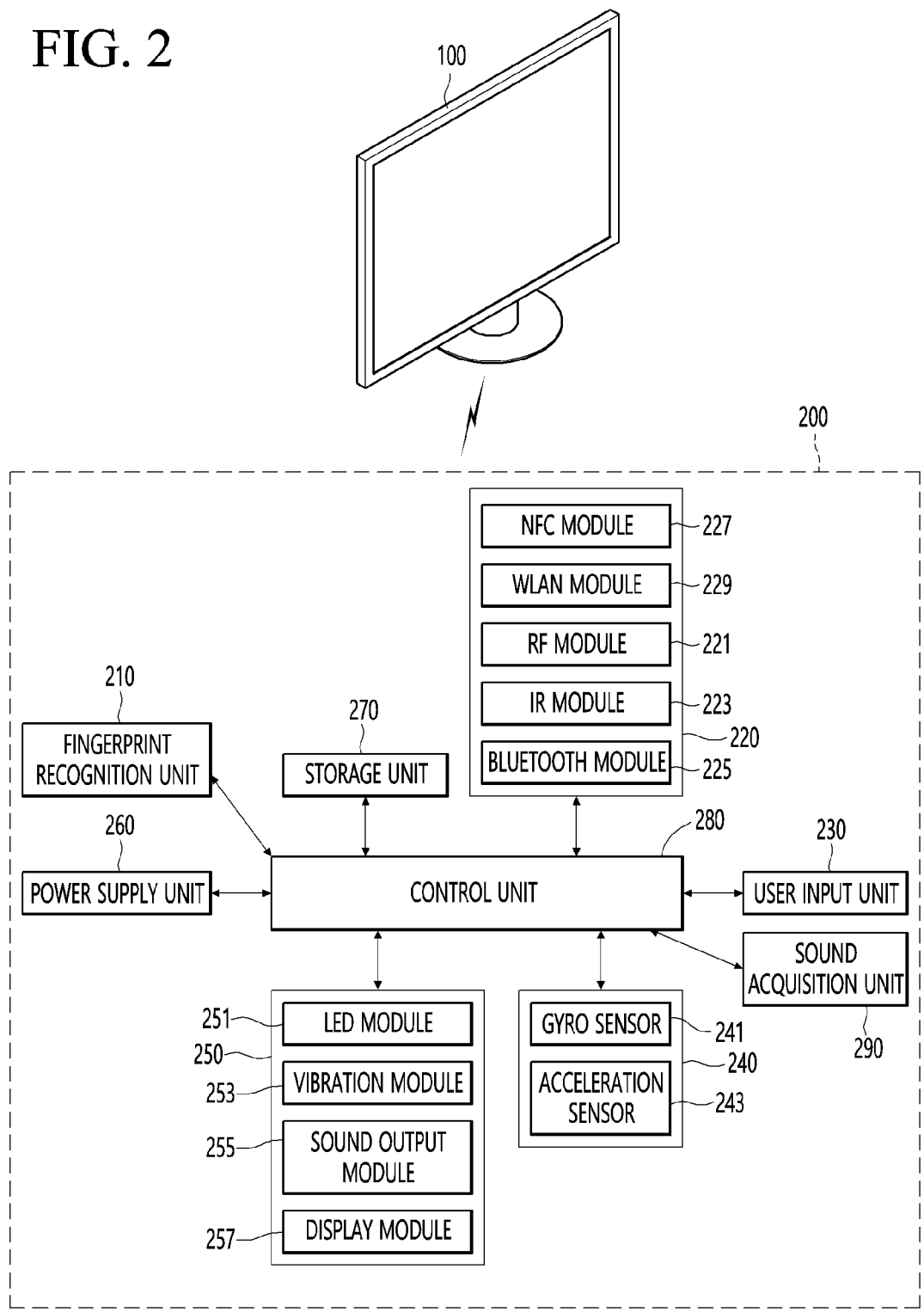
FIG. 2 is a block diagram illustrating a remote control device according to an embodiment of the present invention.
Figure 3:
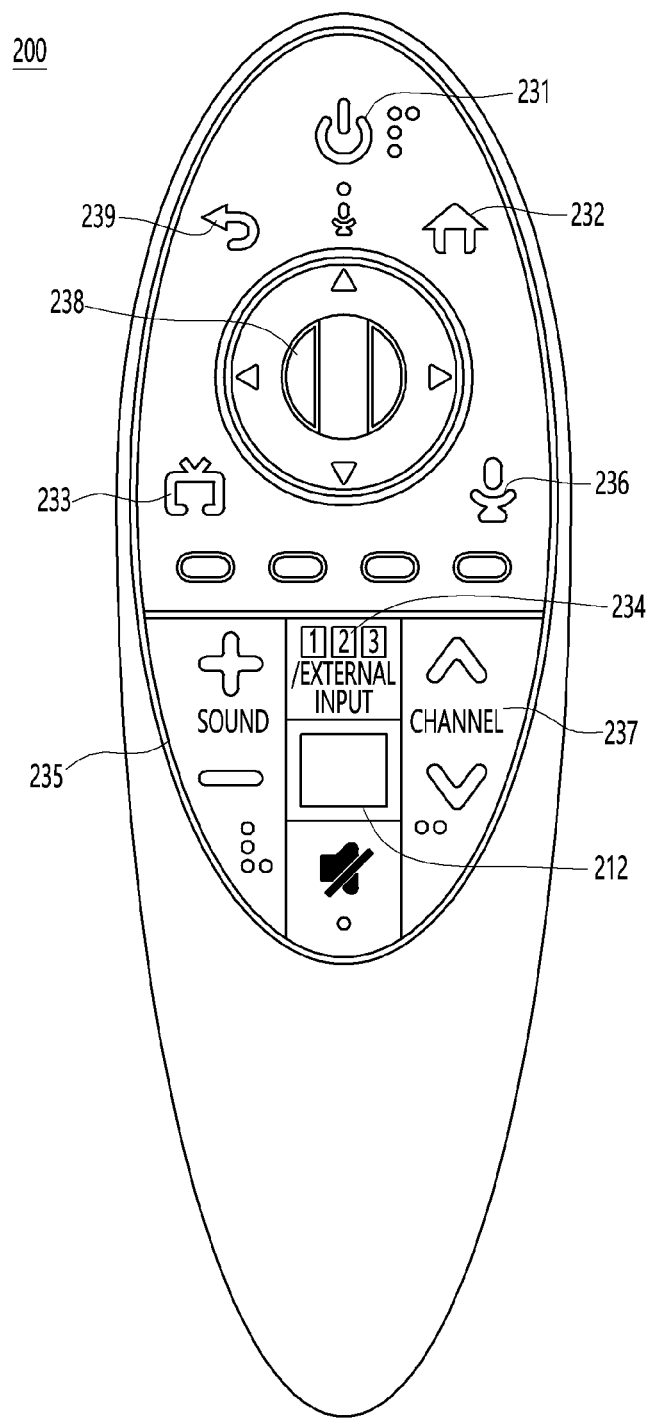
FIG. 3 is a view illustrating an actual configuration of a remote control device according to an embodiment of the present invention.

Then, referring to FIGS. 2 and 3, a remote control device is described according to an embodiment of the present invention.

FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a sound acquisition unit 290.

Referring to FIG. 2, the wireless communication unit 220 transmits/receives signals to/from an arbitrary any one of display devices according to the above-mentioned embodiments of the present invention.

The remote control device 200 can include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present invention, the fingerprint recognition button 212 can perform a push operation and receive a push operation and a fingerprint recognition operation. The power button 231 can be button for turning on/off the power of the display device 100. The home button 232 can be a button for moving to the home screen of the display device 100. The live button 233 can be a button for displaying live broadcast programs. The external input button 234 can be a button for receiving an external input connected to the display device 100. The voice adjustment button 235 can be a button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals in response to manipulation of the user input unit 230 or image or voice signals corresponding to signals transmitted from the display device 100. A user can recognize whether the user input unit 230 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to control of the remote control device 200. The control unit 280 can transmit a signal corresponding to a predetermined key manipulation of the user input unit 230 or a signal corresponding to movement of the remote control device 200 sensed by the sensor unit 240 to the display device 100 through the wireless communication unit 220.

Additionally, the sound acquisition unit 290 of the remote control device 200 can obtain voice.

The sound acquisition unit 290 can include at least one microphone and obtain voice through the microphone 291.

Figure 4:
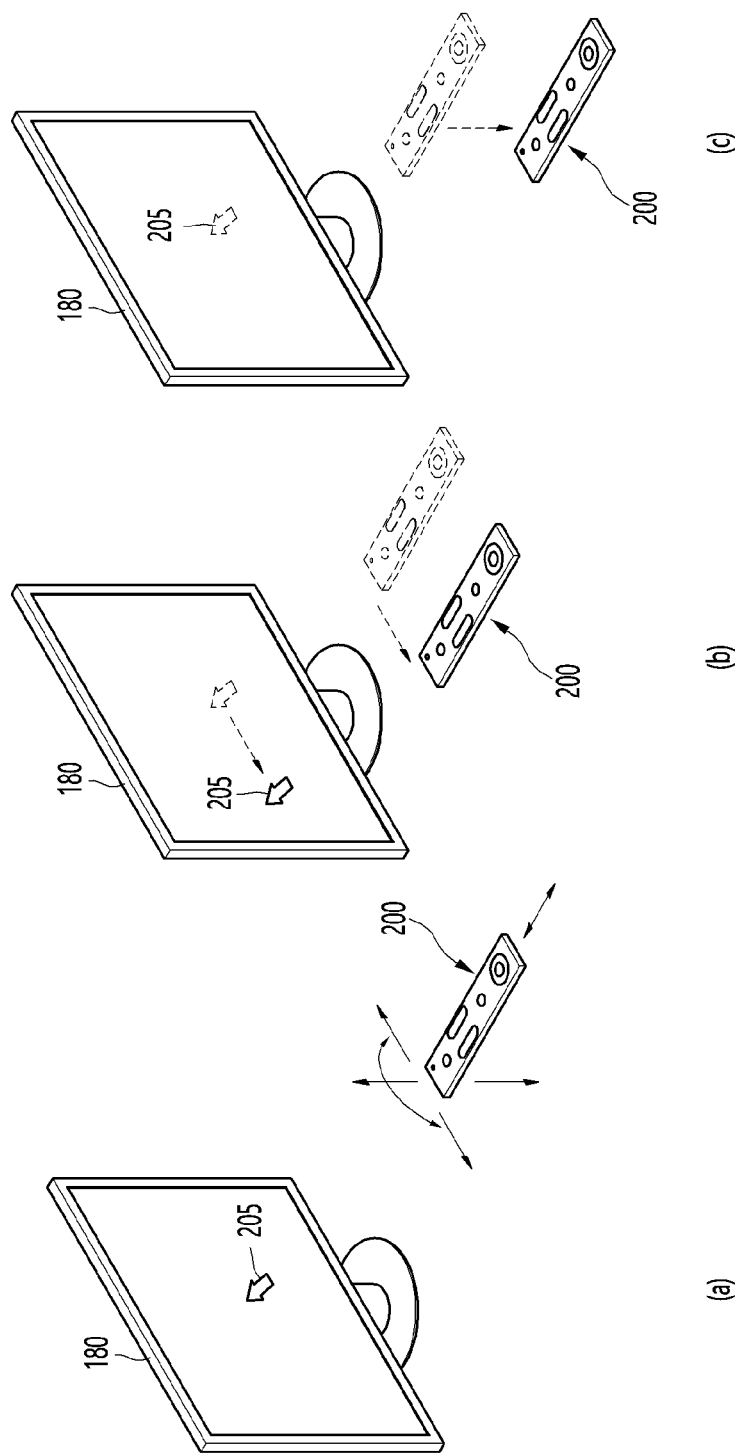
FIG. 4 is a view illustrating an example of utilizing a remote control device according to an embodiment of the present invention.

Next, FIG. 4 is described.

FIG. 4 is a view of utilizing a remote control device according to an embodiment of the present invention.

FIG. 4(a) illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote control device.

FIG. 4(b) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(c) illustrates that while a specific button in the remote control device 200 is pressed, a user moves the remote control device 200 away from the display unit 180. Thus, a selection area in the display unit 180 corresponding to the pointer 205 can be zoomed in and displayed larger.

On the other hand, if a user moves the remote control device 200 close to the display unit 180, a selection area in the display unit 180 corresponding to the pointer 205 can be zoomed out and displayed in a reduced size.

On the other hand, if the remote control device 200 is moved away from the display unit 180, a selection area can be zoomed out and if the remote control device 200 is moved closer to the display unit 180, a selection area can be zoomed in.

Additionally, if a specific button in the remote control device 200 is pressed, recognition of a vertical or horizontal movement can be excluded. That is, if the remote control device 200 is moved away from or closer to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Figure 5:
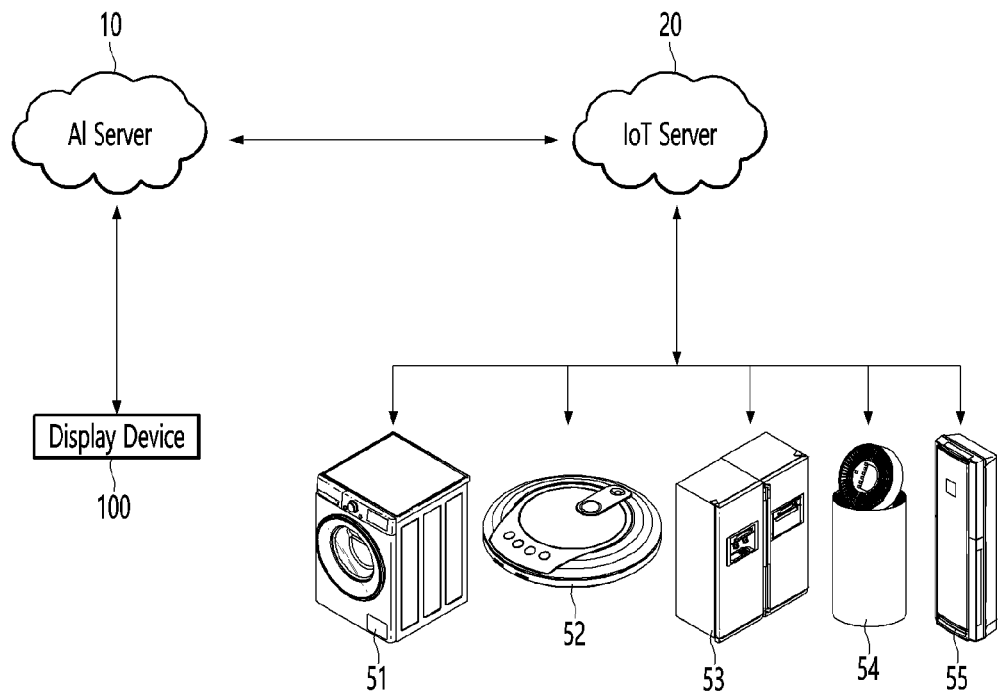
FIG. 5 is a view for describing an artificial intelligence (AI) system according to an embodiment of the present invention.

FIG. 5 is a view for describing an artificial intelligence (AI) system according to an embodiment of the present invention.

An AI system 5 can include a display device 100, an AI server 10, an IoT server 20, and a plurality of home appliances 51 to 55.

The display device 100 can wirelessly communicate with the AI server 10.

The display device 100 can transmit viewing pattern information to the AI server 10.

The display device 100 can periodically transmit viewing pattern information to the AI server 10. A transmission period may be one week, but this is just exemplary.

The IoT server 20 can periodically transmit usage pattern information of one or more home appliances to the AI server 10. The home appliances can be one of a washing machine 51, a robot cleaner 52, a refrigerator 53, an air purifier 54, and an air conditioner 55.

The AI server 10 can learn a correlation between the viewing pattern and the usage pattern by using the viewing pattern information and the usage pattern information.

The AI server 10 can obtain a usage pattern inference model that has been learned according to the learning result. The usage pattern inference model may be an artificial neural network-based model learned through a deep learning algorithm or a machine learning algorithm.

The display device 100 can receive a viewing event and transmit the received viewing event to the AI server 10.

The AI server 10 may determine the usage pattern of one or more home appliances from the viewing event by using the usage pattern inference model.

The AI server 10 can transmit, to the display device 100, usage recommendation information for one or more home appliances based on the determined usage pattern of one or more home appliances.

The display device 100 can output the received usage recommendation information.

The display device 100 can transmit a request for the usage recommendation request to the AI server 10.

The AI server 10 can transmit, to the IoT server 20, a control command for performing an operation corresponding to the usage recommendation information in response to a request for the usage recommendation operation from the display device 100.

The IoT server 20 can transmit, to the corresponding home appliance, an operation command for controlling the operation of the corresponding home appliance according to the received control command.

The corresponding home appliance may perform a specific function suitable for the viewing pattern according to the operation command received from the IoT server 20.

Figure 6:
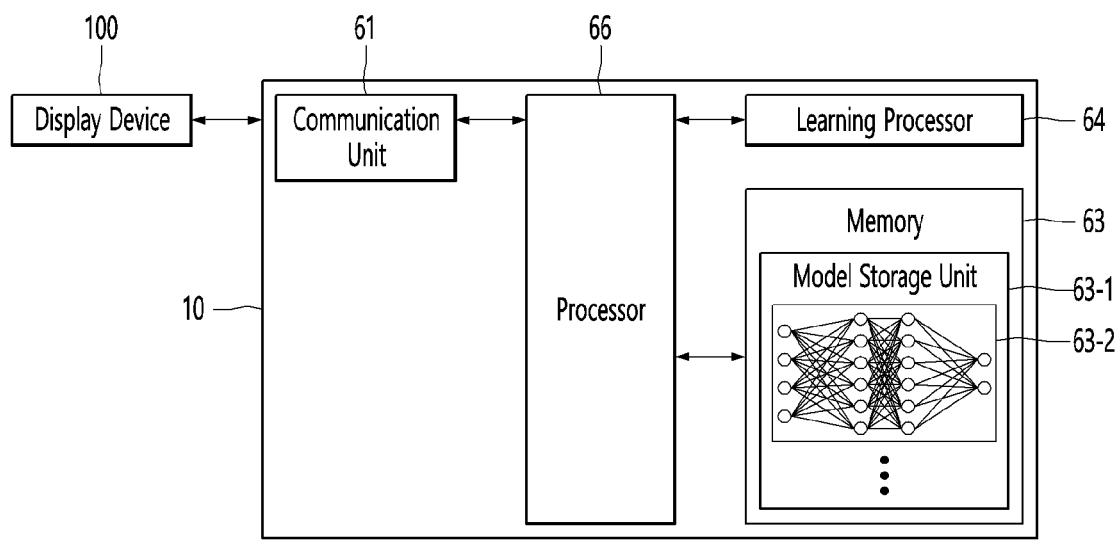
FIG. 6 is a block diagram for describing a configuration of an AI server according to an embodiment of the present invention.

FIG. 6 is a block diagram for describing the configuration of the AI server according to an embodiment of the present invention.

Referring to FIG. 6, the AI server 10 can refer to a device that learns an artificial neural network by using a machine learning algorithm or uses a learned artificial neural network. The AI server 10 can be configured with a plurality of servers to perform distributed processing, and can be defined as a 5G network. In this case, the AI server 10 can be included as a part of the display device 100 to perform at least a part of AI processing together.

The AI server 10 can include a communication unit 61, a memory 63, a learning processor 64, and a processor 66.

The communication unit 61 may transmit or receive data to or from an external device such as the display device 100.

The memory 63 can include a model storage unit 63-1. The model storage unit 63-1 may store a model (or an artificial neural network 63-2) that is being learned or is learned through the learning processor 64.

The learning processor 64 can learn the artificial neural network 63-2 by using training data. The learning model can be used while being mounted on the AI server 10 of the artificial neural network, or can be used while being mounted on the external device such as the display device 100.

The learning model can be implemented as hardware, software, or a combination of hardware and software. When all or part of the learning model is implemented as software, one or more instructions constituting the learning model can be stored in the memory 63.

The processor 660 can infer a result value for new input data by using the learning model and generate a response or a control command based on the inferred result value.

Figure 7:
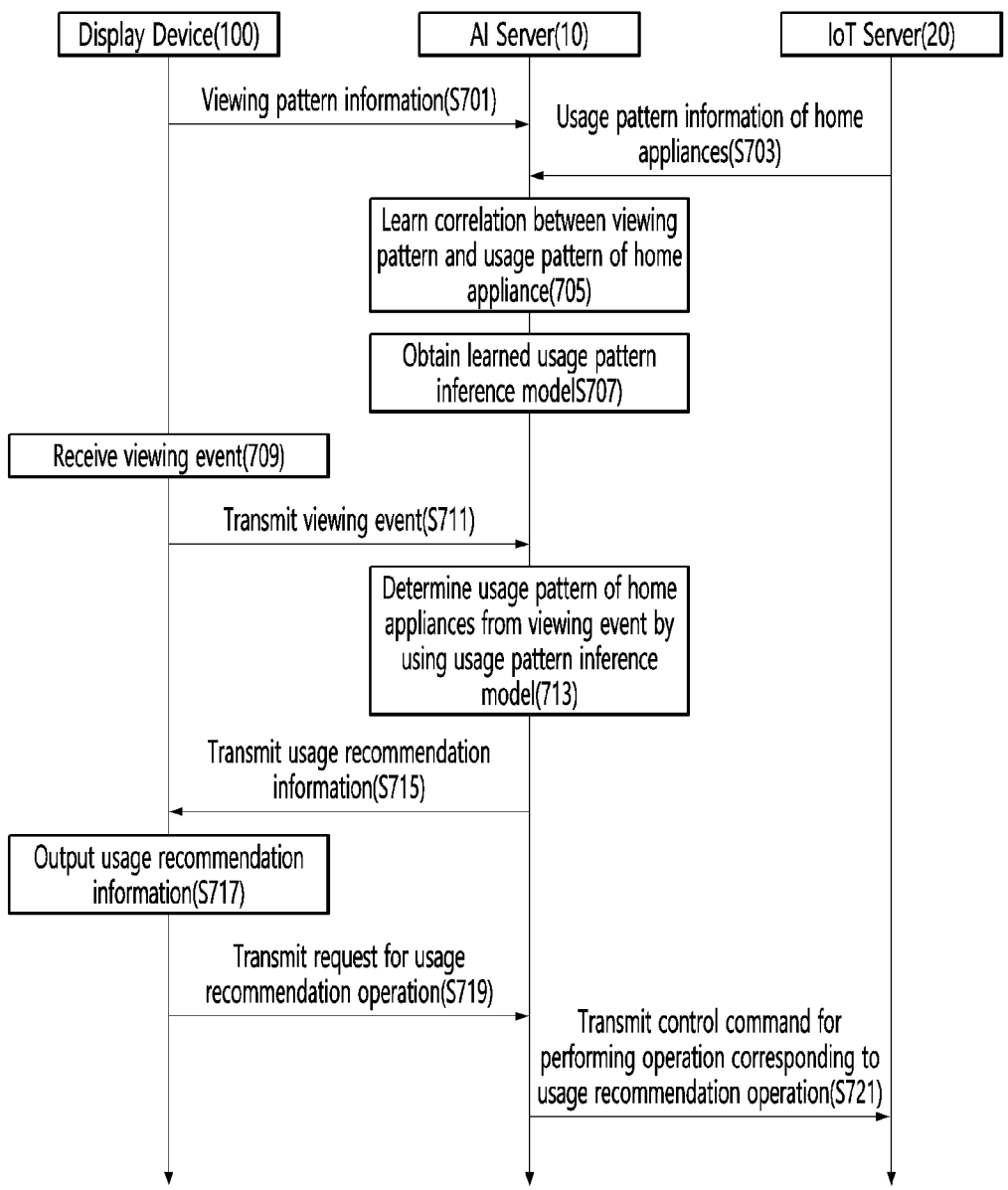
FIG. 7 is a ladder diagram for an operating method of an AI system according to an embodiment of the present invention.

Then, referring to FIG. 7, an operating method of a system according to an embodiment of the present invention is described.

FIG. 7 is a ladder diagram for an operating method of an AI system according to an embodiment of the present invention.

Referring to FIG. 7, the network interface unit 133 of the display device 100 transmits viewing pattern information to the AI server 10 (S701).

The viewing pattern information can include at least one of a power on/off pattern, a sleep reservation pattern, a program viewing pattern, and a viewing situation pattern of the display device 100.

The control unit 170 of the display device 100 can periodically collect viewing pattern information and transmit the collected viewing pattern information to the AI server 10.

The viewing pattern information can be used to infer a usage pattern of the home appliance.

The IoT server 20 transmits usage pattern information of one or more home appliances to the AI server 10 (S703).

The usage pattern information of the home appliance can include an operation pattern of the home appliance to a specific mode, a power on/off pattern of the home appliance, and a pattern related to function control of the home appliance.

The IoT server 20 can periodically receive usage pattern information from each of a plurality of home appliances provided in the house through wireless communication.

The learning processor 64 or the processor 66 of the AI server 10 uses the viewing pattern information and the usage pattern information to learn a correlation between the viewing pattern and the usage pattern (S705).

The learning processor 64 or the processor 66 uses supervised learning to infer a correlation between the viewing pattern information received from the display device 100 and the usage pattern information of one or more home appliances received from the IoT server 20.

The learning processor 64 or the processor 66 can learn the correlation by using the usage pattern inference model that infers the usage pattern of the home appliance from the viewing pattern.

The usage pattern inference model can be an artificial neural network-based model for inferring the usage pattern of the home appliance from the viewing pattern of the display device 100 by using a deep learning algorithm or a machine learning algorithm.

The usage pattern inference model can be learned through supervised learning. Training data used for learning the usage pattern inference model can include the viewing pattern for learning and the usage pattern of the home appliance labeled in the viewing pattern.

The usage pattern inference model and the training data of the usage pattern inference model will be described with reference to FIGS. 8 and 9.

Figures 8, 9:
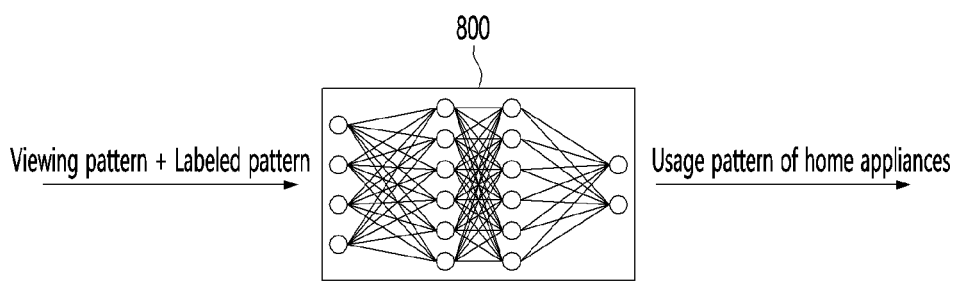
FIG. 8 is a view for describing a usage pattern inference model according to an embodiment of the present invention.
FIG. 9 is a view for describing an example of training data of the usage pattern inference model.

FIG. 8 is a view for describing the usage pattern inference model according to an embodiment of the present invention, and FIG. 9 is a view for describing an example of the training data of the usage pattern inference model.

The usage pattern inference model can use the learning viewing pattern and the labeled usage pattern as input data, and can be learned to minimize the value of the cost function representing the difference between the determined usage pattern of the home appliance and the labeled usage pattern.

When an input feature vector is extracted from the viewing pattern and the extracted input feature vector is input to the usage pattern inference model, a result of determining the usage pattern of the home appliance can be output as a target feature vector.

The usage pattern inference model can learn model parameters to minimize the cost function corresponding to the difference between the output target feature vector and the labeled usage pattern.

On the other hand, the usage pattern inference model can be a personalized model. That is, the display device 100 can identify the user through recognition of a user image through a camera, a login, and the like. When transmitting the viewing pattern, the display device 100 can also transmit user identification information to the AI server 10.

Therefore, the usage pattern inference model can be learned to be optimized for a specific individual.

On the other hand, the usage pattern inference model of FIG. 8 can also be learned by the display device 100. To this end, the display device 100 can receive the usage pattern information of one or more home appliances from one or more home appliances or the IoT server 20.

FIG. 9 is a view illustrating an example of training data used for learning the usage pattern inference model.

Referring to FIG. 9, the training data can include the viewing pattern of the display device 100 and the usage pattern of the home appliance labeled thereto.

When the sleep reservation function of the display device 100 is set and the number of times the sleep mode setting of the air conditioner is set simultaneously is collected more than a certain number of times, the learning processor 64 or the processor 66 can label the sleep mode setting of the air conditioner in the sleep reservation function of the display device 100.

Similarly, in the display device 100, if a children's program is played back, the air purifier is turned on. If the number of times the wind speed of the air conditioner is set to weak wind is a certain number of times or more, the learning processor 64 or the processor 66 can label the playback of the children's program with the air purifier on and the weak wind control setting of the air conditioner.

As another example, when movie content is played back on the display device 100, if the number of times the lighting of the lighting device is dimmed is a certain number of times or more, the learning processor 64 or the processor 66 can label the playback of the movie content with the lighting dim processing setting of the lighting device.

FIG. 7 is described again.

The learning processor 64 or the processor 66 of the AI server 10 obtains the usage pattern inference model that has been learned according to the learning result (S707).

The learning processor 64 or the processor 66 can store the learned usage pattern inference model in the model storage unit 63-1.

The learning processor 64 or the processor 66 can transmit the usage pattern inference model to the display device 100 through the communication unit 61.

The control unit 180 of the display device 100 receives a viewing event (S709), and transmits the received viewing event to the AI server 10 through the network interface unit 133 (S711).

In an embodiment, the viewing event can be an event related to the viewing pattern of the display device 100.

The viewing event can include one or more of a user's voice command or an operation command of the display device 100 through the remote control device 200.

For example, the viewing event can be a voice command uttered by the user, such as <Turn off the TV when this program is over>. In this case, the control unit 180 can transmit voice data corresponding to the voice command to the AI server 10.

The AI server 10 can convert voice data into text data and analyze the intention of the converted text data by using a natural language processing engine.

The AI server 10 can analyze the intention of the text data and obtain a viewing pattern corresponding to the analyzed intention. For example, the viewing pattern for <Turn off the TV when this program is over> can be a sleep reservation function setting.

The processor 66 of the AI server 10 determines the usage pattern of one or more home appliances from the viewing event by using the usage pattern inference model (713).

The processor 66 can obtain the viewing pattern of the display device 100 from the viewing event, and determine the usage pattern of one or more home appliances from the viewing pattern by using the usage pattern inference model.

The processor 66 of the AI server 10 transmits, to the display device 100, usage recommendation information for one or more home appliances based on the determined usage pattern of one or more home appliances (S715).

The processor 66 can generate usage recommendation information indicating the determined usage pattern of one or more home appliances and transmit the generated usage recommendation information to the display device 100 through the communication unit 61.

The usage recommendation information can include information for recommending the operation of one or more home appliances determined according to the viewing pattern of the display device 100.

The control unit 170 of the display device 100 outputs the received usage recommendation information (S717).

The control unit 170 can output the usage recommendation information as audio through the audio output unit 185.

As another example, the control unit 170 can display the usage recommendation information through the display unit 180.

As the usage recommendation information is output, the user can receive a guide for controlling the operation of the home appliance that matches his/her viewing pattern. Therefore, simultaneous control of home appliances optimized for individuals can be performed, thereby providing improved user experience.

The control unit 170 of the display device 100 transmits a request for the usage recommendation operation to the AI server 10 (S719).

The control unit 170 can receive a request for controlling the operation of one or more home appliances according to a use recommendation, and can transmit the received request to the AI server 10.

The control unit 170 can receive the request for the usage recommendation operation from the remote control device 200.

As another example, the control unit 170 can receive a request command for the usage recommendation operation through a microphone provided in the user input interface unit 150.

The AI server 10 transmits, to the IoT server 20, a control command for performing an operation corresponding to the usage recommendation information in response to the request for the usage recommendation operation from the display device 100 (S721).

The control command can include commands for controlling each of two or more home appliances. For example, the control command can include a first command for controlling an operation of a first home appliance and a second command for controlling an operation of a second home appliance.

The IoT server 20 can transmit, to the corresponding home appliance, an operation command for controlling the operation of the corresponding home appliance according to the received control command. The corresponding home appliance can perform a specific function suitable for the viewing pattern according to the operation command received from the IoT server 20.

According to an embodiment of the present invention, the user can conveniently control the operation of the home appliance without an operation for separately controlling the operation of the home appliance.

On the other hand, even without a request for the usage recommendation operation, the AI server 10 can automatically transmit, to the IoT server 20, a control command for performing the operation corresponding to the usage recommendation information.

That is, operations S715 to S719 of FIG. 7 can be omitted.

Therefore, the user can feel the effect of automatically controlling the home appliance without a request for the usage recommendation operation.

Figure 10:
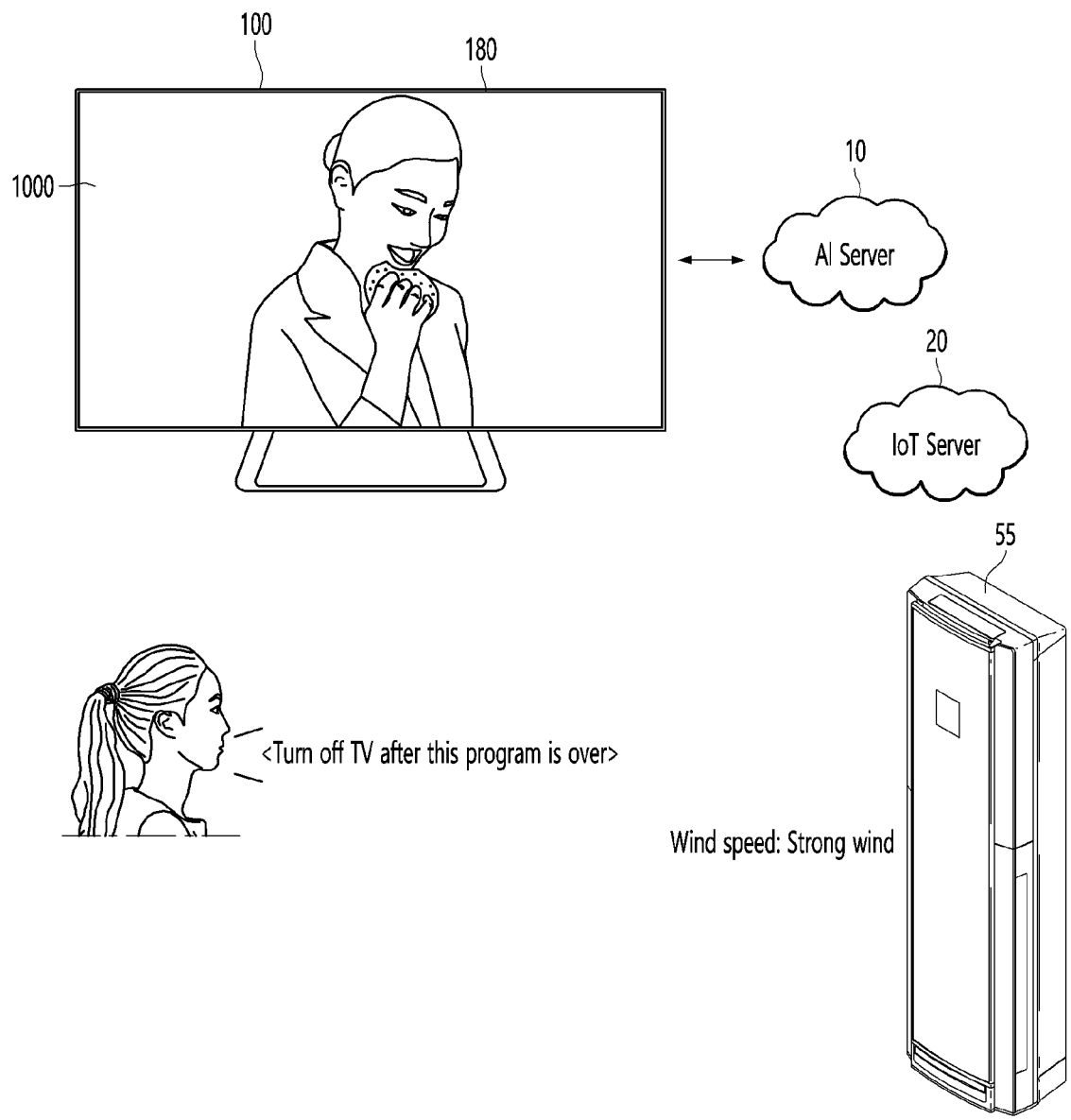
FIGS. 10 and 11 are views for describing a process of allowing an operation of a home appliance to be automatically controlled according to a user's viewing event, according to an embodiment of the present invention.
Figure 11:
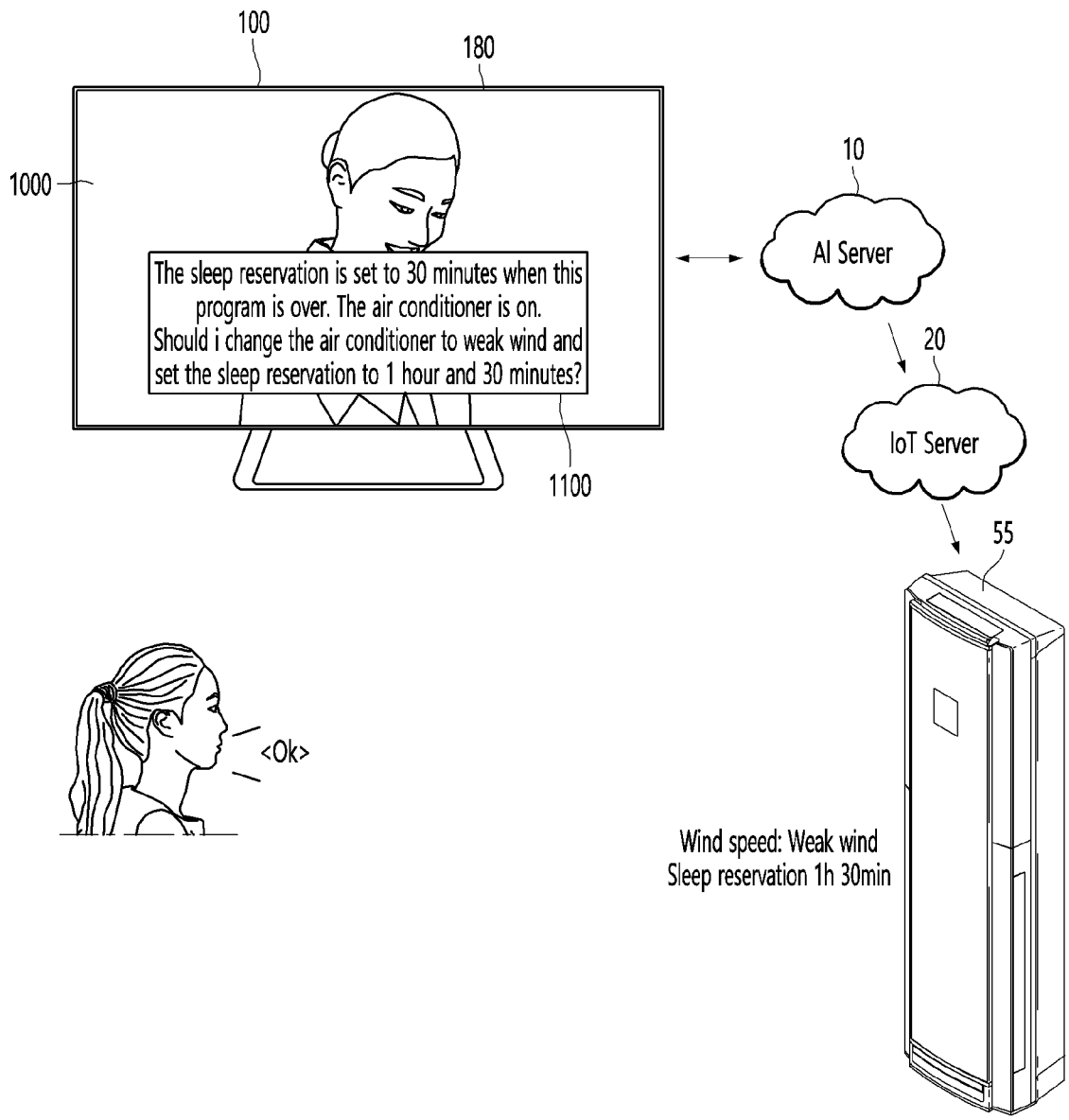

FIGS. 10 and 11 are views for describing a process of allowing an operation of a home appliance to be automatically controlled according to a user's viewing event, according to an embodiment of the present invention.

First, referring to FIG. 10, the user is watching a program 1000 through the display unit 180 of the display device 100, and the wind speed of the air conditioner 55 is set to strong wind.

After that, the user can utter a voice command <Turn off the TV when this program is over>.

The display device 100 can receive the voice command uttered by the user and transmit the received voice command to the AI server 10.

The AI server 10 can identify the intention of the received voice command and obtain a viewing pattern that matches the identified intention. The obtained viewing pattern can be a sleep reservation pattern.

The AI server 10 can use the usage pattern inference model 800 to determine the usage pattern of the home appliance that matches the sleep reservation pattern.

The determined usage pattern of the home appliance can be the sleep mode setting pattern of the air conditioner.

The AI server 10 can generate usage recommendation information indicating the determined sleep mode setting pattern of the air conditioner and transmit the generated usage recommendation information to the display device 100.

Referring to FIG. 11, the display device 100 can display usage recommendation information 1100 received from the AI server 10 through the display unit 180.

The usage recommendation information 1100 can include a text for automatically setting the operation mode of the air conditioner to the sleep mode.

The sleep mode can be a mode in which the wind speed of the air conditioner 55 is set to weak wind and the power of the air conditioner 55 is turned off after 1 hour and 30 minutes.

When the user utters a voice command <Ok>, the display device 100 can determine that the user agrees to the usage recommendation information 1100.

The display device 100 can transmit the user's consent decision to the AI server 10.

The AI server 10 can transmit, to the IoT server 20, a control command for setting the operation mode of the air conditioner 55 to the sleep mode according to the user's consent decision. The IoT server 20 can transmit, to the air conditioner 55, an operation command for setting the operation mode of the air conditioner 55 to the sleep mode according to the received control command.

The air conditioner 55 can set its own operation mode to the sleep mode according to the operation command received from the IoT server 20.

As such, according to an embodiment of the present invention, the user can be provided with improved user experience in which the home appliance is automatically controlled so as to match his/her viewing situation.

Figure 12:
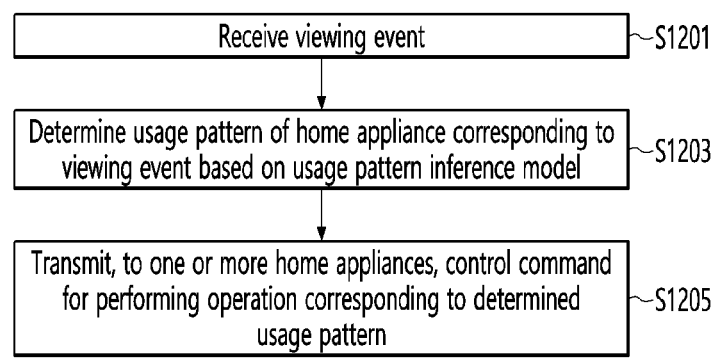
FIG. 12 is a flowchart for explaining an operating method of a display device according to an embodiment of the present invention.
Figure 13:
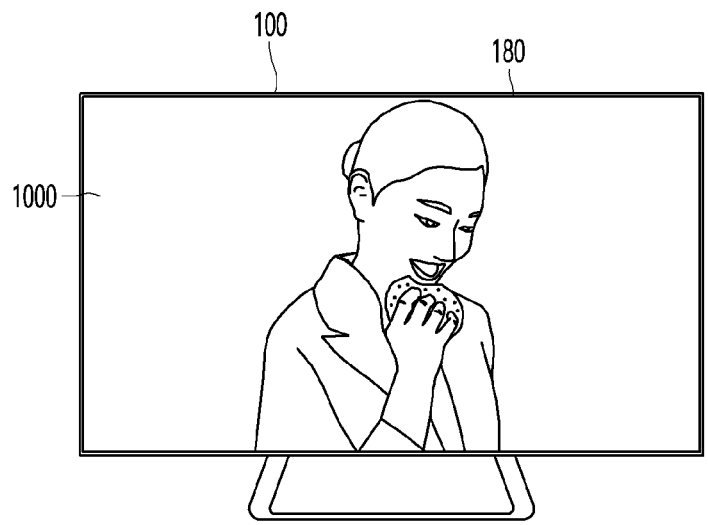
FIGS. 13 and 14 are views for describing a process, performed by the display device, of directly controlling the operation of the home appliance in response to a viewing event.
Figure 13:
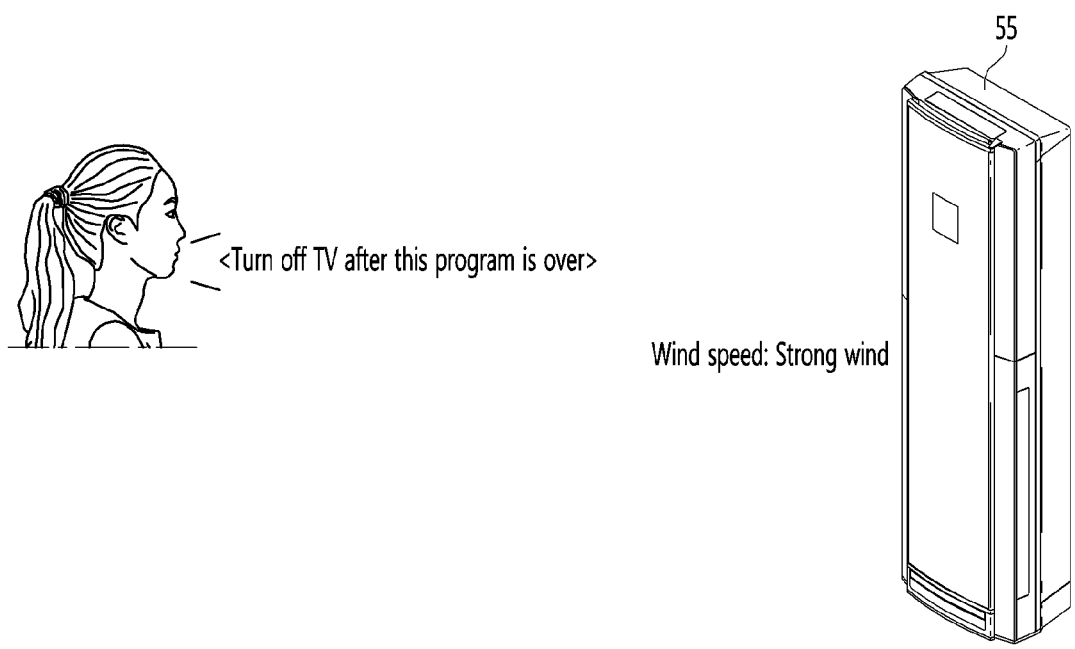
Figure 14:
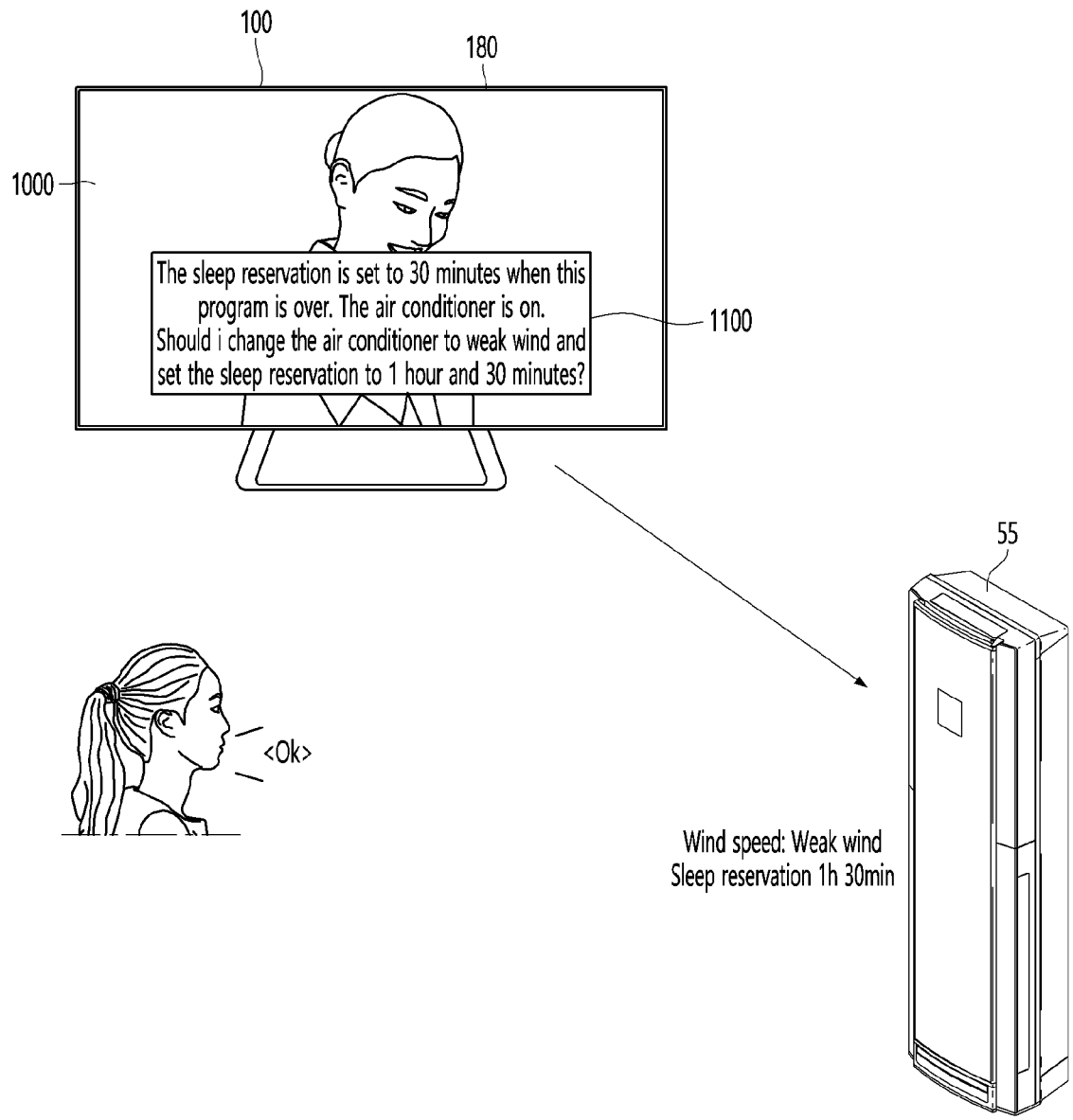

FIG. 12 is a flowchart for explaining an operating method of a display device according to an embodiment of the present invention, and FIGS. 13 and 14 are views for describing a process, performed by the display device, of directly controlling the operation of the home appliance in response to a viewing event.

In particular, FIG. 12 is a view for describing an example in which the use pattern inference model is stored in the storage unit 140 of the display device 100 and the display device 100 directly transmits a control command for performing an operation corresponding to the determined use pattern.

Referring to FIG. 12, the control unit 170 of the display device 100 receives a viewing event (S1201).

The viewing event can be a user's voice command. The control unit 170 can receive the voice command through the microphone provided in the user input interface unit 150.

As another example, the control unit 170 can receive, from the remote control device 200, the voice command received by the microphone provided in the remote control device 200.

Referring to FIG. 13, the display device 100 plays back the program 1000 through the display unit 180. When the user utters the voice command <Turn off the TV when this program is over>, the display device 100 can receive the voice command as the viewing event.

Again, FIG. 12 is described.

The control unit 170 determines the usage pattern of one or more home appliances corresponding to the viewing event based on the usage pattern inference model stored in the storage unit 140 (S1203).

The control unit 170 can receive the viewing event and identify the intention of the viewing event. When the viewing event is the voice command, the control unit 170 can convert the voice command into text data and obtain the intention of the converted text data by using the natural language processing engine.

The control unit 170 can obtain the user's viewing pattern from the obtained intention.

The control unit 170 can recognize that the user's viewing pattern is the sleep reservation setting pattern from the voice command <Turn off the TV when this program is over>.

The control unit 170 can determine the sleep mode setting pattern of the air conditioner 55 as the usage pattern of the air conditioner 55 from the sleep reservation setting pattern based on the usage pattern inference model stored in the storage unit 140.

The usage pattern inference model can be received from the AI server 10 and stored in the storage unit 140.

As another example, the usage pattern inference model can be a model learned by the control unit 170 of the display device 100 by using the training data shown in FIG. 9.

The control unit 170 transmits, through the wireless communication unit 173, a control command for performing an operation corresponding to the determined usage pattern to one or more home appliances (S1205).

The control unit 170 can transmit, to the air conditioner 55, a control command for setting the sleep mode of the air conditioner 55 obtained from the sleep reservation setting pattern.

The wireless communication unit 173 of the display device 100 and the air conditioner 55 can perform short-range wireless communication.

The short-range wireless communication standard may be one of Bluetooth and Wi-Fi.

Referring to FIG. 14, the display device 100 can display, on the display unit 180, the usage recommendation information 1100 indicating the operation recommendation of the air conditioner 55 according to the sleep reservation setting pattern.

When the user receives a request for permitting the operation recommendation for the air conditioner 55, the display device 100 can transmit, to the air conditioner 55, a control command for setting the operation mode of the air conditioner 55 to the sleep mode.

The request for permitting the operation recommendation of the air conditioner 55 can be received through the user's voice command.

The air conditioner 55 can switch its own operation mode to the sleep setting mode according to the control command received from the display device 100. The sleep setting mode can be a mode in which the wind speed is set to weak wind and the power of the air conditioner 55 is turned off after 1 hour and 30 minutes.

As such, according to an embodiment of the present invention, since the operation of the home appliance is controlled to match the viewing pattern of the display device 100, there is no need for an action for the operation of the home appliance separately. Therefore, the user can be provided with improved user experience.

According to an embodiment of the present disclosure, the above-described method can be implemented with codes readable by a processor on a medium in which a program is recorded. Examples of the medium readable by the processor include a ROM, a RAM, a CD-ROM, a magnetic tape, a floppy disk, an optical data storage device, and the like, and can include those implemented in the form of carrier wave (for example, transmission over Internet).

The display device described above is not limitedly applicable to the configuration and method of the above-described embodiments, and the embodiments are configured by selectively combining all or part of each of the embodiments such that various modifications can be made.

The invention claimed is:

1. A display device for controlling one or more home appliances, the display device comprising:
    a display;
    a storage unit configured to store a learned usage pattern inference model by using a deep learning algorithm or a machine learning algorithm;
    a user input interface configured to receive a viewing event; and
    a control processor configured to:
    obtain a viewing pattern of the display device from the received viewing event,
    use the usage pattern inference model to obtain a usage pattern of the one or more home appliances, wherein the usage pattern of the one or more home appliances corresponds to the obtained viewing pattern of the display device, and
    cause the display to display usage recommendation information for controlling operation of the one or more home appliances, wherein the usage recommendation information comprises the obtained usage pattern of the one or more home appliances that corresponds to the obtained viewing pattern of the display device.

2. The display device of claim 1, further comprising a wireless communication unit configured to wirelessly communicate with the one or more home appliances,
    wherein the control processor is configured to transmit, to the one or more home appliances, a control command corresponding to the usage pattern of the one or more home appliances obtained through the wireless communication unit.

3. The display device of claim 1, wherein the usage pattern inference model is a supervised artificial neural network-based model using the deep learning algorithm or the machine learning algorithm.

4. The display device of claim 3, wherein training data for learning the usage pattern inference model includes a viewing pattern of the display device and a usage pattern of the one or more home appliances labeled thereto.

5. The display device of claim 2, wherein, when the control processor receives a request for a usage recommendation operation corresponding to the usage recommendation information, the control processor is configured to transmit the control command to the one or more home appliances.

6. The display device of claim 1, wherein the viewing event includes one of a user's voice command or a command for operating the display device received from a remote control device.

7. The display device of claim 6, wherein the control processor is configured to identify a user's intention from the voice command and obtain the viewing pattern corresponding to the identified intention.

8. The display device of claim 1, wherein, when the viewing pattern is a sleep reservation setting pattern of the display device and the home appliance is an air conditioner, the usage pattern of the home appliance is a pattern for switching an operation mode of the air conditioner to a sleep reservation setting mode.

9. A display device for controlling one or more home appliances, the display device comprising:
 a display;
 a network interface unit configured to communicate with an artificial intelligence server;
 a user input interface unit configured to receive a viewing event; and
 a control processor configured to:
 transmit the received viewing event to the artificial intelligence server,
 receive, from the artificial intelligence server, usage recommendation information indicating usage recommendation for controlling operation of the one or more home appliances, in response to the received viewing event, wherein the usage recommendation comprises a usage pattern of the one or more home appliances that corresponds to a viewing pattern of the display device, and
 cause the display to display the received usage recommendation information for controlling operation of the one or more home appliances.

10. The display device of claim 1, wherein the control processor is configured to transmit a viewing pattern of the display device to the artificial intelligence server, and to use the viewing pattern to learn a correlation with a usage pattern of the one or more home appliances.

11. The display device of claim 10, wherein the usage recommendation information is information for recommending the usage pattern of the one or more home appliances corresponding to the viewing pattern.

12. The display device of claim 9, wherein the control processor is configured to receive a request for a usage recommendation operation corresponding to the usage recommendation information, and to transmit the received request to the artificial intelligence server.

13. The display device of claim 9, wherein the viewing event includes one of a user's voice command or a command for operating the display device received from a remote control device.

* * * * *